Patented May 5, 1931

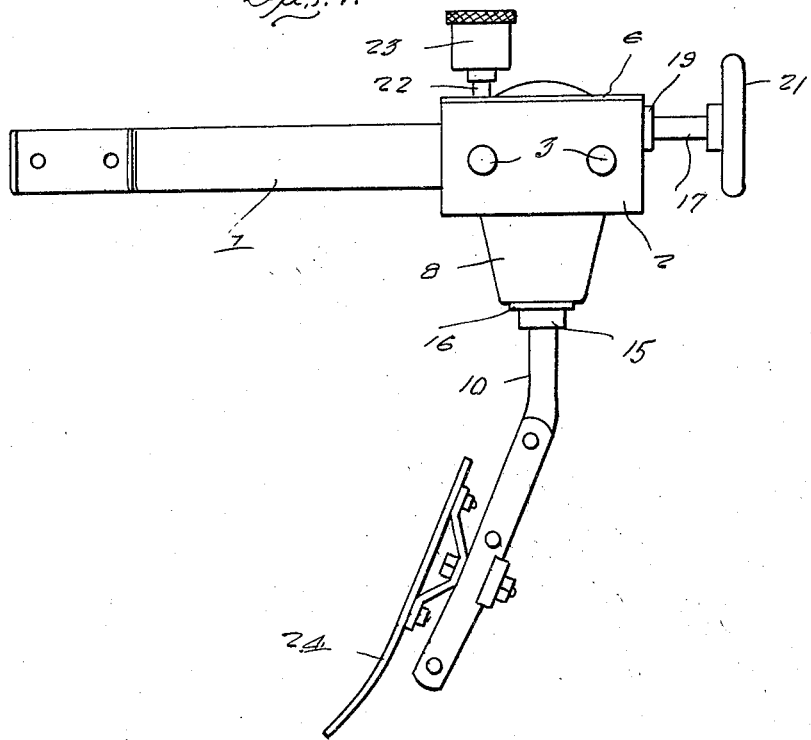
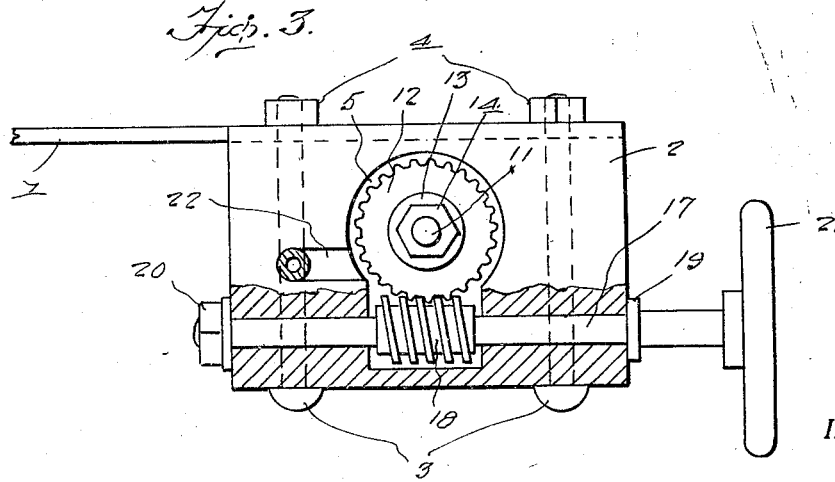

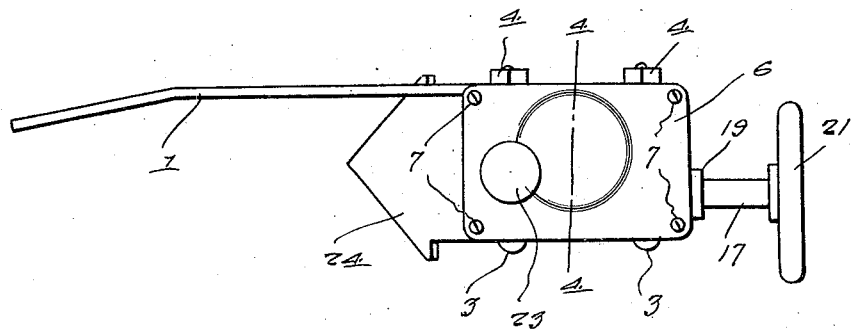
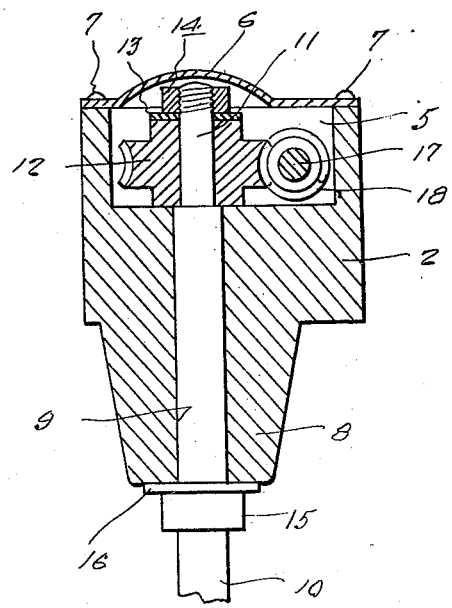

1,803,778

UNITED STATES PATENT OFFICE

JOHN HENRY STARR AND HOWARD STARR, OF SHICKLEY, NEBRASKA

CULTIVATOR SHOVEL MOUNTING

Application filed December 7, 1929. Serial No. 412,483.

This invention relates to cultivator shovels and has for one of its objects to provide, in a manner as hereinafter set forth a cultivator shovel having means associated therewith for expeditiously adjusting said shovel angularly with respect to the cultivator beams and the line of travel of the cultivator for throwing the dirt through which the shovel travels at the proper angle.

An important feature of the invention resides in the provision of a shovel standard which is swivelly mounted and has fixed thereon a pinion gear for actuation by a manually operated worm for rotating the standard and adjusting the angle of said shovel.

Other objects of the invention are to provide, in a manner as hereinafter set forth, a cultivator shovel of the aforementioned character which will be simple in construction, strong, durable, efficient in its use and which may be manufactured at low cost.

The foregoing and other objects and advantages of the invention will become apparent from a study of the specification, taken in connection with the accompanying drawings wherein like characters of reference designate corresponding parts throughout the several views, and wherein :—

Figure 1 is a view in side elevation of a cultivator shovel constructed in accordance with this invention.

Figure 2 is a top plan view thereof.

Figure 3 is a top plan view of the adjusting mechanism with the cover plate removed therefrom, said view being partially broken away in horizontal section to illustrate the manually operated means for adjusting the shovel.

Figure 4 is a vertical cross-sectional view taken substantially on the line 4—4 of Figure 2 and showing the upper portion only of the shovel standard.

Referring to the drawings in detail, the reference character 1 designates the supporting means of the cultivator upon the rear end portion of which is secured a metallic casing 2 through the medium of the transversely extending bolts and nuts 3 and 4, respectively. The casing 2 is provided with a chamber 5 which is closed by a removable cover plate 6 secured to the upper side of the casing 2 through the medium of suitable securing elements such as screws 7. The casing 2 is further provided with a depending downwardly tapering integral extension 8 and a vertical bore 9 extends through the extension 8 and the casing 2 and communicates with the chamber 5 at the bottom thereof, as best illustrated in Figure 4 of the drawings. A shovel standard 10 has its upper portion extending rotatably through the bore 9 and terminates in a reduced threaded upper end portion 11 which extends vertically in the chamber 5 and has fixed thereon a gear 12. The gear 12 is secured against accidental displacement on the reduced portion 11 through the medium of a washer 13 and a nut 14 which is threaded on said reduced portion. A collar 15 is fixed on the standard 10 below the extension 8 and interposed between said collar and extension is a washer 16. The collar 15 and the washer 16 functions as stop means for limiting the upward movement of the standard in the bore 9, as will be apparent.

As best illustrated in Figure 3 of the drawings a horizontally disposed rotatable shaft 17 extends longitudinally through the casing 2 and the chamber 5 and has fixed thereon, within said chamber a worm gear 18 which meshes with the gear 12 on the standard 10. The shaft 17 has fixed thereon a stop collar 19 for engagement with one end of the casing 2 and is threaded on its forward end for the reception of the securing nut 20. The rear end of the shaft 17 projects rearwardly from the casing 2 and has fixed thereon the actuating handle 21 in the form of a wheel. An oil duct 22 communicates with the chamber 5 and projects upwardly from the casing 2 and has mounted on its upper free end an oil cup 23. A shovel 24 is supported on the lower end portion of the standard 10, as illustrated in Figure 1 of the drawings.

In the use of the invention, the operator rotates the shaft 17 for the purpose of imparting rotary movement to the gear 12 and the standard 10 with the obvious result that the angle of the shovel 24 may be adjusted to suit said operator. The worm and gear connection between the standard 10 and the shaft 17 prevents accidental rotary movement of the standard to stresses or strain to which the shovel 24 is subjected in traveling through the ground. The relatively moving parts of the device are amply lubricated at all times through the medium of the oil cup 23 and the duct 22 which supplies lubricating oil to the chamber 5.

It is believed that the many advantages of a cultivator shovel constructed in accordance with this invention will be readily understood, and although the preferred embodiment of the invention is as illustrated and described, it is to be understood that changes in the details of construction may be had which will fall within the scope of the invention as claimed.

What is claimed is:—

A cultivator shovel of the class described comprising a metallic casing adapted to be mounted on the free end of a cultivator beam and having an open chamber in its upper portion, a removable cover plate mounted on the casing and extending over the chamber, an integral downwardly tapering extension depending from the lower side of the casing, said extension and casing having a vertical bore extending therethrough communicating with the chamber at its lower side, a vertical shovel standard extending through the bore, a reduced threaded extension on the upper end of the standard extending upwardly into the chamber, a gear fixed on the extension, a retaining nut for the gear threaded on the extension, stop means on the standard engaging with the lower end of the extension on the casing for limiting the upward movement of said standard through the bore, a horizontally disposed shaft extending longitudinally and rotatably in the casing and through the chamber, a worm gear fixed on said shaft within the chamber and in mesh with the first named gear, means for manually rotating the shaft, a cultivator shovel on the lower end portion of the standard and means mounted on the casing for lubricating the gears therein.

In testimony whereof we affix our signatures.

JOHN HENRY STARR.
HOWARD STARR.